Sept. 30, 1969  V. C. M. JACON  3,469,352
DEVICE FOR GRINDING CRYSTAL
Filed June 16, 1966  2 Sheets-Sheet 1
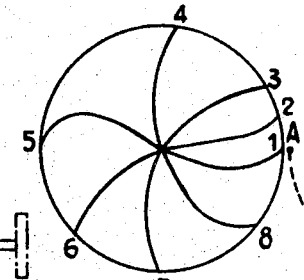
Fig. 3.
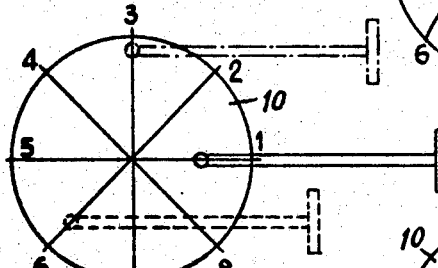
PRIOR ART Fig. 1.
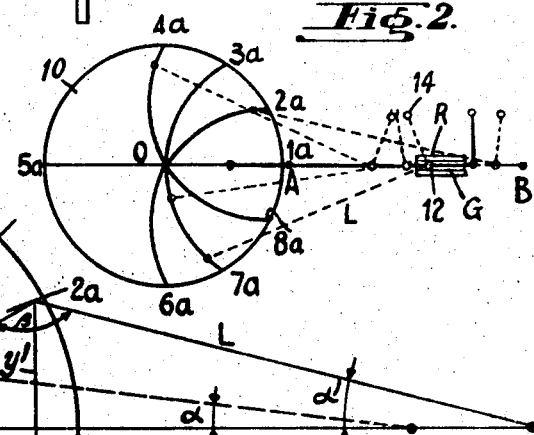
Fig. 2.
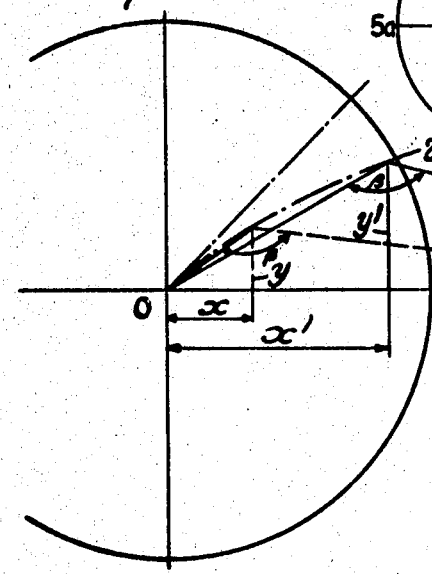
Fig. 4.
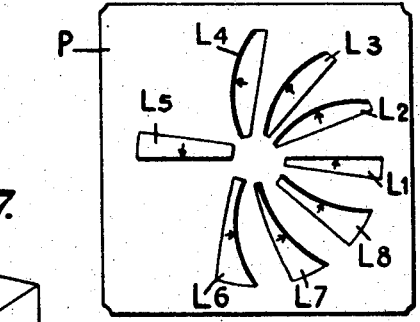
Fig. 6.
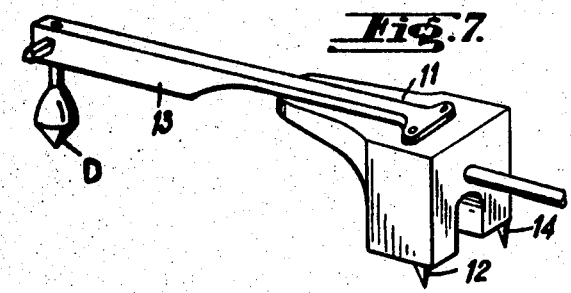
Fig. 7.

United States Patent Office 3,469,352
Patented Sept. 30, 1969

3,469,352
DEVICE FOR GRINDING CRYSTAL
Vital Charles Marius Jacon, 2 Impasse de la Paix,
St. Etienne, Loire, France
Filed June 16, 1966, Ser. No. 557,940
Claims priority, application Switzerland, June 21, 1965,
8,629/65
Int. Cl. B24b 7/00, 9/00, 1/00
U.S. Cl. 51—121                                    4 Claims

ABSTRACT OF THE DISCLOSURE

An apparatus for cutting a crystal having preferential wear directions such as a diamond, wherein the crystal is supported on an arm which is movable on the abrasive surface of a grinding wheel and wherein one end of the arm is guided along a reference line while the crystal is guided along curved lines passing through the axis of the grinding wheel and wherein the curved line is the locus of points situated at the apex of an invariable angle, one side of which is of variable length and passes through the axis of the grinding wheel while the other side is formed by a straight line joining the two ends of the arm.

---

The invention relates to the cutting of crystals, and in particular diamonds.

The diamond which is the hardest body known has the property of being crystallized in complicated shapes related to the octahedron, the rhombohedral dodecahedron, the cubo-octahedron, the trioctahedron, etc. as well as with hemihedral shapes and with holohedral deformations of all these basic shapes. Other materials crystallize in different systems but always with definite directions. The machining and the shaping of these materials can only be effected with a diamond reduced to powder of the order of 3 to 6μ. This machining is extremely long and difficult, due on the one hand, to the extraordinary resistance to wear of this body and on the other hand to its particular crystallization which produces infinite resistances to all known bodies in certain working directions. One must thus machine the diamond with a grinding wheel set with diamonds but along preferential directions which it is practically impossible to detect by visual examination and which result from comparative tests during the work and from long effort which is difficult to carry out. When in order to make a facet, one has found the working direction it must be maintained up to the end of the work and in particular during the final polishing which is effected by moving the diamond or the crystal being worked over a greater surface of the grinding wheel.

For this many devices have been proposed, the greater number of which require the knowledge of experts, while others rely upon mechanical means; but none are satisfactory as regards the criteria of working speed and in particular of accuracy of the work. When cutting, the diamond to be machined is fixed by means of welding or mechanically at the end of a "Grip" or "Tang" provided with two legs. The cutting method most employed is that which requires movement of the crystal along eight radii of the grinding wheel which theoretically permits presenting the crystal along eight positions at 45° one from the other. The crystal support must thus be moved in rigorously parallel planes. Such movement is practically impossible, and above all during the final polishing.

The present invention has for an object the provision of an apparatus for cutting a crystal offering preferential wear directions.

With respect to preferential wear direction, it should be understood that a crystal is to be cut by a grinding wheel and that the grinding wheel should not be worn, as may be the case if the crystal is not placed along a particular path as is explained hereinafter.

The invention starts from the assumption that if one wishes to machine a diamond, thus attack it along a preferential direction (which, incidentally, has no relationship to the crystalline axis), it is necessary:

1° to discover this direction easily,

2° to continue to employ it during all the time of cutting and polishing without causing any perturbations by the movements required by the polishing, 3° in the case of very high precision machining, that the plane of the facet to be obtained must be rigorously placed relative to one or several reference faces of the diamond and this rigorous positioning, within a few seconds of angular degree, must be easy and fool-proof during the whole time of the preliminary tests and of the work proper.

This method is characterized by the fact that one displaces said crystal over the surface of a circular grinding wheel following lines passing through the center of the grinding wheel and each forming the locus of the points situated at the apex of an invariable angle of which one side of variable length passes through the center of the grinding wheel and the other is formed by a straight line of constant length the free end of which moves along a reference line.

This invention comprises a device for carrying out the above method, and in which the crystal to be cut is mounted on a support at one end of an arm movable on the abrasive surface of the grinding wheel. This device is characterized by means for guiding the other end of said supporting arm along a reference line and means for guiding the end of said arm carrying the crystal such that the angle formed by the straight line joining the two ends of the arm and the straight line passing through the center of the grinding wheel is constant upon movement of the support.

The advantages of the invention include permitting the rapid and easy grinding of a crystal once the preferential wear direction is determined and to do this without having to conduct long tests.

The accompanying drawing shows, by way of example, one embodiment of the method of the invention and also shows, by way of example, two embodiments of the device for carrying out this method.

FIGURE 1 shows diagrammatically an arrangement for a known cutting method.

FIGURES 2 and 3 are diagrams of guiding curves.

FIGURE 4 is a diagram showing the trigonometric construction of one of the curves of FIG. 2.

FIGURE 6 is a view similar to FIG. 5 of a variant on a smaller scale.

FIGURE 7 is a perspective view of a known crystal support.

Figure 5:
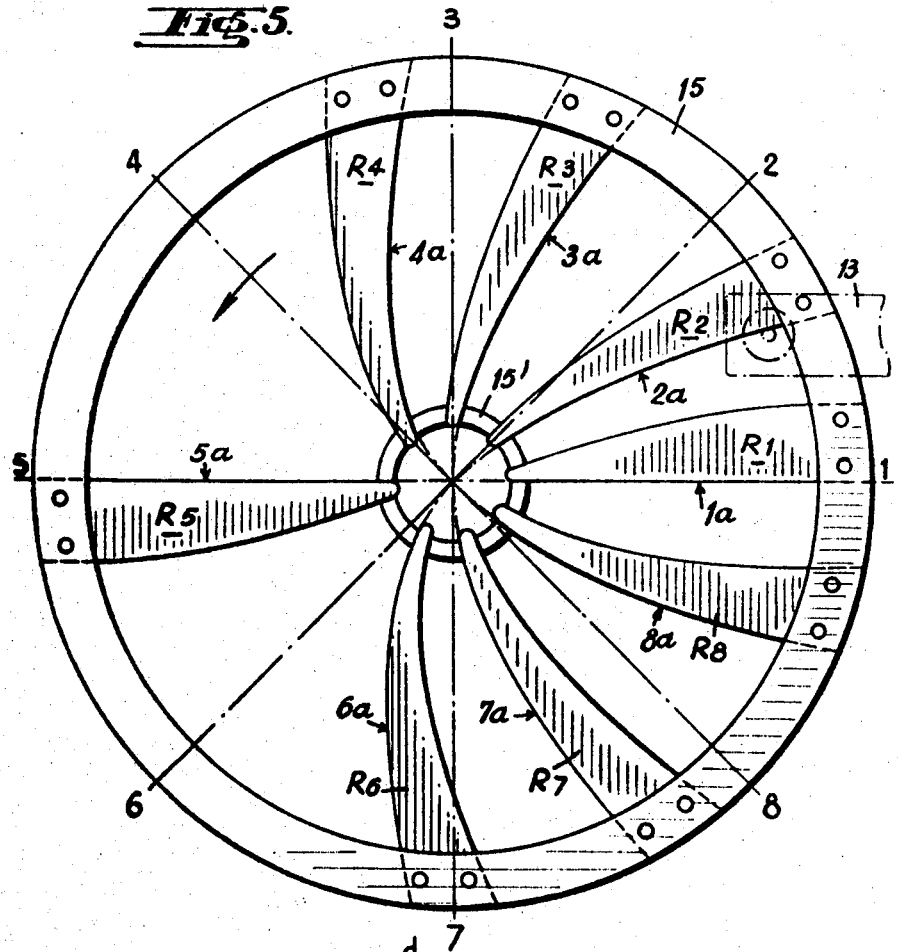
FIGURE 5 is a diagrammatic plan view of the first embodiment of the device.

In the description which follows, it is assumed that the crystal D to be cut is a diamond. Instead of being moved on the grinding wheel 10 along eight radii at 45° as shown at 1-8 in FIG. 1, the diamond is moved along lines passing through the center of the grinding wheel 10 and extending along particular paths. To this end, the support 11 of FIG. 7 is utilized, the length of the arm 13 of which is sufficient to permit placing the diamond anywhere on the grinding wheel and whose leg 12 is moved along the straight line AB passing through the center 0 of the grinding wheel 10, the leg 14 serving solely as a support. As an example, leg 12 may be supported in a groove G in a rail R extending along line AB such that the leg 12 is constrained to travel in this groove. The two legs 12 and 14 of the support 11 move in the same plane as that of the abrasive surface of the grinding wheel or in a plane parallel to the latter.

The lines 0-1a and 0-2a are straight lines but all the others 0-2a, 0-3a, 0-4a, 0-6a, 0-7a and 0-8a are trigonometric curves.

The length L of the support, that is to say the distance between the diamond and the leg 12 of the support, is assumed to be equal to unity. FIG. 4 shows the construction of the curve 2a corresponding to the straight line 2 at 45° of FIG. 1. This curve 2a is the locus of the points situated at the apex of an angle $\beta=135°$ one side of which passes through the center 0 of the grinding wheel and the other side is formed by the arm L of the support the free end or leg 12 of which moves along the straight reference line AB. This curve 2a may be constructed either point by point by the trigonometric calculation starting with the equations $X = tg(\alpha + 45°) \cdot \sin \alpha$
$y = \sin \alpha$ These equations are derived as follows:

$y = L \sin \alpha = \sin \alpha$, assuming L is of unit length
$x/y = \tan \cdot [\beta - (90 - \alpha)]$ since $\beta = 135°$
$x = \tan \cdot (45° + \alpha) \cdot y$
$x = \tan \cdot (45° + \alpha) \cdot \sin \alpha$.

Alternatively, curve 2a may be constructed with the assistance of a triangular templet one side of which is equal to L and of which the angle $\beta$ at the apex is of 135°. By maintaining the angle $\beta$ always equal to 135°, the crystal D will have constant orientation relative to the abrasive surface as the leg 12 is moved along line AB. Hence, the surface which is ground can be the preferential direction of wear of the diamond.

For the other curves 3a and 4a corresponding to the straight lines 3 and 4 at 90° and 135° respectively, other trigonometric relations are derived permitting their construction point by point or triangular template is utilized having an angle at the apex $\beta = 90°$ and 45° respectively in order to construct these curves in a continuous manner.

Curves 6a, 7a and 8a are symmetrical with the curves 4a, 3a, and 2a relative to the straight reference line AB.

The leg 12 of the support 11 could also move along a straight reference line not passing through the center of the grinding wheel. The lines 1 and 5 then become curves. Such is also the case when the leg 12 moves along a curve or a broken line.

FIG. 3 shows the case in which the leg 12 moves along a curve AB formed by a semi-circle with a center 0'.

On the other hand, one could provide more or less than eight lines at 45° as described (e.g. six, ten, twelve, thirteen, etc.).

FIG. 5 shows at set of eight guide strips or guides R1, R2, R3, R4, R5, R6, R7, R8 fixed on two concentric circles 15 and 15' disposed above the grinding wheel (not shown). The edge 1a, 2a, 3a, 4a, 5a, 6a, 7a, 8a of these guides each has the shape of the corresponding curves of FIG. 2 and it is against this edge of the guide that the diamond or its attachment bears.

Instead of the support 11 such as represented in FIG. 7, one could utilize any other method of fixing the crystal. In the variant of FIG. 6, the guide strips are replaced by apertures L1, L2 . . . L8 made in a plate P the edges of which designated by arrows have the shape of the corresponding curve of FIG. 2 and serve as a guide for the diamond.

The guide strips R1, R2 . . . R8, the plate P with the apertures L1, L2 . . . L8 or the thrust axis may be endowed with a slightly eccentric movement about the true center of the grinding wheel, this to permit a slight displacement of the tangency circle of the diamond on the grinding wheel and thus avoid possible scores.

Figure 8:
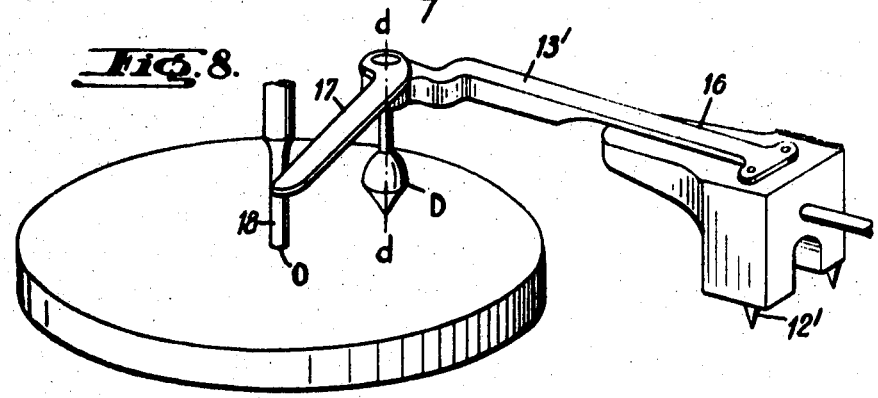
FIGURE 8 is a perspective view of a second embodiment of the device.

In the embodiment shown in FIG. 8, the device comprises a support 16 similar to the support 11 of FIG. 7 but carrying at the end of the arm 13 opposite the leg 12' a dog 17 hinged to the arm 13' along an axis d—d perpendicular to the plane of the grinding wheel 10 and passing through the center of the diamond D. This dog 17 may be blocked in any position and bears against a fixed or rotary spindle 18 situated above the center 0 of the grinding wheel. With this arrangement, the support 16 may be placed anywhere relative to the grinding wheel on the same plane or on a surface parallel to the plane of the grinding wheel.

In all cases the diamond may be mounted stationary or movable on its support. The mounting is such that the crystalline axis of the surface of the diamond to be machined must form a constant angle (for a given facet) relative to the direction of movement of the abrasive. In a circular grinding wheel all the radii are by definition perpendicular at any meeting point to the direction of movement of the abrasive. The diamond must thus be made angularly integral with a grinding wheel radius whatever the distance between the crystal and the center of the grinding wheel. This is attained by moving the diamond on the abrasive surface of the grinding wheel along the particular curves calculated as a function of the movements of the support as described above.

The device described may be applied not only to a diamond but to any crystalline material which is difficult to machine, such as precious stones, quartz for piezo-electric uses, semi-conductors, etc., silicon, germanium, etc.

In a variant, the device comprises a plate placed above the active face of the grinding wheel and having apertures one side of which constitutes for each aperture one of said guiding lines for the crystal to be cut.

What I claim is:

1. A device for cutting a crystal having preferential wear directions, said device comprising a grinding wheel rotatable about an axis and having an abrasive surface, an arm movable on the abrasive surface of the grinding wheel, said arm having opposite ends, a support at one end of said arm for holding a crystal which is to be cut, means for guiding the other end of said supporting arm along a reference line and means for guiding the end of said arm carrying the crystal along selected paths such that for each of said paths the angle formed by a straight line joining the two ends of the arm and the straight line passing through the axis of the grinding wheel and the end of the arm carrying the crystal is constant upon movement of the support.

2. A device according to claim 1, wherein said means for guiding, the end of the arm carrying the crystal comprises a set of guides disposed above the grinding wheel, each guide having an edge extending along a line passing through the axis of the grinding wheel and having the shape of a curve which is the locus of the point of intersection of said lines forming said angle, as said other end of the supporting arm travels along said reference line, the end of the supporting arm carrying the crystal to be cut bearing against said edge of the particular guide.

3. A device according to claim 1 comprising a hinged dog capable of being blocked in any position on the supporting arm along an axis perpendicular to the plane of the grinding wheel and passing through the center of the crystal to be cut, and at right angles to the axis of the grinding wheel, and means for engaging said dog such that the dog bears against said axis of the grinding wheel during movement of the support.

4. A device according to claim 1, wherein said means for guiding the end of the arm carrying the crystal comprises a plate placed above the abrasive face of the grinding wheel and having apertures one side of each of which constitutes a guide path for the crystal to be cut.

References Cited

UNITED STATES PATENTS

| | | | |
|---|---|---|---|
| 523,504 | 7/1894 | Armeny | 51—124 |
| 2,391,979 | 1/1946 | Kershaw | 51—122 |
| 2,527,592 | 10/1950 | Spira | 51—122 |
| 3,077,706 | 2/1963 | Coons | 51—124 |
| 3,254,456 | 6/1966 | Clark | 51—218 X |

HAROLD D. WHITEHEAD, Primary Examiner

U. S. Cl. X.R.

51—128, 283